(12) United States Patent
Elliott

(10) Patent No.: US 8,126,016 B2
(45) Date of Patent: *Feb. 28, 2012

(54) METHOD AND APPARATUS FOR INFORMATION DISSEMINATION

(75) Inventor: Brig Barnum Elliott, Arlington, MA (US)

(73) Assignees: Verizon Corporate Services Group Inc., Basking Ridge, NJ (US); Raytheon BBN Technologies Corp., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/609,501

(22) Filed: Oct. 30, 2009

(65) Prior Publication Data

US 2010/0046555 A1 Feb. 25, 2010

Related U.S. Application Data

(63) Continuation of application No. 10/793,606, filed on Mar. 4, 2004, now Pat. No. 7,616,663.

(51) Int. Cl.
*H04J 3/24* (2006.01)
*H04J 3/16* (2006.01)
*H04H 20/71* (2008.01)
*H04B 7/204* (2006.01)

(52) U.S. Cl. ........ 370/474; 370/312; 370/316; 370/468; 370/394

(58) Field of Classification Search ............ 370/252, 370/474, 468, 312, 316, 231–232, 392, 394, 370/230.1, 236
See application file for complete search history.

(56) References Cited

U.S. PATENT DOCUMENTS 5,507,039 A 4/1996 Honma
(Continued)

*Primary Examiner* — Kwang B Yao
*Assistant Examiner* — Candal Elpenord

(57) ABSTRACT

A system and method for transmitting information to a group of recipient devices according to a transmission schedule is provided. A sequence of M blocks of information are transformed into N transformed blocks, where M and N are integers and N≧M. Each of the N transformed blocks are transmitted to a group of user devices in a network in accordance with a transmission schedule. At one of the user devices, at least some of the N transformed blocks are received. When K distinct transformed blocks have been received, where K is an integer and K<N, the information is reconstructed from the K transformed blocks. In some implementations, at least one recipient device reduces power, after receiving a recipient schedule including a transmission time of at least one desired content, until or near the transmission time of the at least one desired content.

11 Claims, 13 Drawing Sheets

U.S. PATENT DOCUMENTS

| | | | |
|---|---|---|---|
| 5,701,582 A | 12/1997 | DeBey | |
| 5,838,668 A | 11/1998 | Okada et al. | |
| 6,006,336 A | 12/1999 | Watts, Jr. et al. | |
| 6,073,250 A | 6/2000 | Luby et al. | |
| 6,081,909 A | 6/2000 | Luby et al. | |
| 6,163,870 A | 12/2000 | Luby et al. | |
| 6,195,777 B1 | 2/2001 | Luby et al. | |
| 6,226,301 B1* | 5/2001 | Cheng et al. | 370/474 |
| 6,233,252 B1 | 5/2001 | Barker et al. | |
| 6,397,053 B1 | 5/2002 | Ghiazza | |
| 6,519,693 B1 | 2/2003 | Debey | |
| 6,686,880 B1 | 2/2004 | Marko et al. | |
| 6,694,149 B1 | 2/2004 | Ady et al. | |
| 6,694,469 B1* | 2/2004 | Jalali et al. | 714/748 |
| 6,741,834 B1 | 5/2004 | Godwin | |
| 6,778,558 B2* | 8/2004 | Balachandran et al. | 370/470 |
| 6,920,152 B1* | 7/2005 | Chang et al. | 370/474 |
| 6,934,288 B2* | 8/2005 | Dempo | 370/394 |
| 6,961,326 B1* | 11/2005 | Chang et al. | 370/338 |
| 6,987,741 B2 | 1/2006 | Kelly et al. | |
| 7,116,667 B2* | 10/2006 | Jiang et al. | 370/394 |
| 7,412,714 B2 | 8/2008 | Kitayama | |
| 7,443,814 B2 | 10/2008 | Agarwal et al. | |
| 7,542,482 B2* | 6/2009 | Casaccia et al. | 370/473 |
| 2001/0024435 A1 | 9/2001 | Birdwell et al. | |
| 2001/0036185 A1* | 11/2001 | Dempo | 370/392 |
| 2002/0006116 A1 | 1/2002 | Burkhart | |
| 2002/0015422 A1 | 2/2002 | Inada et al. | |
| 2002/0085713 A1 | 7/2002 | Feig et al. | |
| 2003/0039271 A1 | 2/2003 | Mizuno | |
| 2003/0081582 A1 | 5/2003 | Jain et al. | |
| 2004/0088430 A1 | 5/2004 | Busi et al. | |
| 2005/0099943 A1 | 5/2005 | Naghian et al. | |
| 2006/0056330 A1 | 3/2006 | Anderson et al. | |
| 2006/0154603 A1 | 7/2006 | Sachs et al. | |

* cited by examiner

| Content ID | Version ID | Block # | # of Trans-missions | Meta-content packet # | # Times to Tx | % BW |
|---|---|---|---|---|---|---|
| 502 | 504 | 506 | 508 | 510 | 512 | 514 |

| Tx Time | Content ID | Version ID | File Size |
|---|---|---|---|
| 602 | 604 | 606 | 608 |

METHOD AND APPARATUS FOR INFORMATION DISSEMINATION

RELATED APPLICATIONS

This application is a continuation of U.S. patent application Ser. No. 10/793,606 filed Mar. 4, 2004, the entire disclosure of which is incorporated herein by reference.

TECHNICAL FIELD

The invention pertains to communication networks. In particular the invention pertains to methods and systems for sending content to a group of recipient devices.

BACKGROUND OF THE INVENTION

Information dissemination has proved of great utility in both commercial and military situations. Such dissemination has typically been arranged so that content sent from one central point can be received at a number of recipient points. For example, television and radio stations have generally used radio towers as their central points, whereas cable systems have used cable head-ends. Satellite television and radio systems have used satellites. In military situations, satellites and other "elevated platforms" (such as aircraft or lighter than air vehicles) have been used as the central point from which information is disseminated to the intended recipients, e.g., ships, field camps, or vehicles.

The above systems have generally been quite simple in their operation. For example, well-known data dissemination systems such as a Global Broadcast System have repeated transmission of a particular piece of information N times in order to boost the probability that it is correctly received by each intended recipient. Although such strategies have the virtue of simplicity, they are not robust in that they do not provide adequately for recovering content if some, possibly even a large fraction, of the data cannot be correctly received by a recipient.

Methods of robustly transmitting packetized data were developed such that for each piece of content, a potentially limitless stream of meta-content is generated, which includes mathematical metaphors that describe the original content. A bit-by-bit copy of the original content may be quickly recovered from any portion of the meta-content that, in aggregate, is equal to the length of the original content, regardless of the order in which the meta-content was received. These methods, however, do not provide for packets being transmitted according to a schedule that defines the number of times each block of information may be transmitted, a particular order for transmitting blocks, or a maximum amount of bandwidth to be used to transmit the block. The use of such a schedule would make it possible to adjust broadcast transmission characteristics by simply changing the schedule. In addition, the use of a schedule would make it possible for recipient devices to operate in a reduced power mode until, according to the schedule, useful information is to be broadcast. Further, the existing methods do not describe a way for recipients to determine when information in the process of being received is outdated and should be discarded.

SUMMARY OF THE INVENTION

A method and system are provided for robustly sending data to multiple recipients from one or more disseminating nodes. The disseminating nodes may disseminate version information and/or scheduling information.

In one aspect of the invention, a sequence of M blocks of information are transformed into N transformed blocks, where M and N are integers and $N \geq M$. Each of the N transformed blocks are transmitted to a group of user devices in a network in accordance with a transmit schedule. At least one of the user devices, at least some of the N transformed blocks are received. When K distinct transformed blocks have been received, where K is an integer and $K<N$, the information is reconstructed from the K transformed blocks.

In another aspect of the invention, a system is provided for transmitting information to multiple user devices. The system includes a node configured to transform a sequence of M blocks of information into N transformed blocks, where M and N are integers and $N \geq M$, and at least one of the user devices is configured to receive the transformed blocks transmitted by the node. The at least one user device is further configured to maintain a record of received ones of the transformed blocks and reconstruct the information from the received transformed blocks when K distinct transformed blocks have been received, where K is an integer and $K<N$. Additionally, the at least one user device is further configured to receive a recipient schedule, indicating a transmission time of at least one desired content, from the node, and is further configured to be in a reduced power mode after receiving the recipient schedule until the time of transmission of the at least one desired content or near the time of transmission of the at least one desired content.

In a third aspect of the invention, a node configured to transmit to a group of user devices is provided. The node includes a storage configured to store a transmission schedule, a transformation component configured to transform a sequence of M blocks of the information into N transformed blocks, where M and N are integers and $N \geq M$, and a transmitter configured to transmit according to the transmission schedule.

In a fourth aspect of the invention, a user device configured to receive a group of transformed blocks from a node is provided. The user device includes a storage configured to maintain a record of received ones of the transformed blocks and a reconstruction module configured to reconstruct original content used to derive the transformed blocks from less than a total number of the transformed blocks. The user device is configured to run in a reduced power mode after the reconstruction module reconstructs the original content including a recipient schedule having a transmission time of at least one desired content and is further configured to end the reduced power mode at the transmission time of the at least one desired content or near the transmission time of the at least one desired content.

In a fifth aspect of the invention, a computer-readable medium is provided. The computer-readable medium stores instructions executable by one or more processors to perform a method for transmitting information to a group of user devices. The method includes transforming a sequence of M blocks of original content into N transformed blocks, where M and N are integers and $N \geq M$, and transmitting each of the N transformed blocks in accordance with a transmission schedule.

In a sixth aspect of the invention, a computer-readable medium is provided that stores instructions executable by one or more processors to perform a method for receiving transformed blocks transmitted by a node to a group of devices. In the method, at least one of the devices receives at least some of the transformed blocks transmitted by the node. Original content is reconstructed from the transformed blocks when at least K blocks of the transformed blocks have been received, where K is an integer that is less than a total number of the transformed blocks transmitted by the node. When the reconstructed original content includes a recipient schedule having a transmission time of at least one desired content, power is reduced until the transmission time of the at least one desired content or until near the transmission time of the at least one desired content.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 5 depicts an exemplary transmission schedule;

FIG. 6 depicts an exemplary recipient schedule;

DETAILED DESCRIPTION

The following detailed description of the invention refers to the accompanying drawings. The same reference numbers in different drawings may identify the same or similar elements. The following detailed description does not limit the invention. Instead, the scope of the invention is defined by the appended claims and equivalents.

Embodiments of the invention may be implemented in hardware, software, or firmware. The firmware may in a Read-Only Memory (ROM) and the software may reside on, for example, a medium such as a floppy disk, optical disk, or CD ROM.

Figure 1:
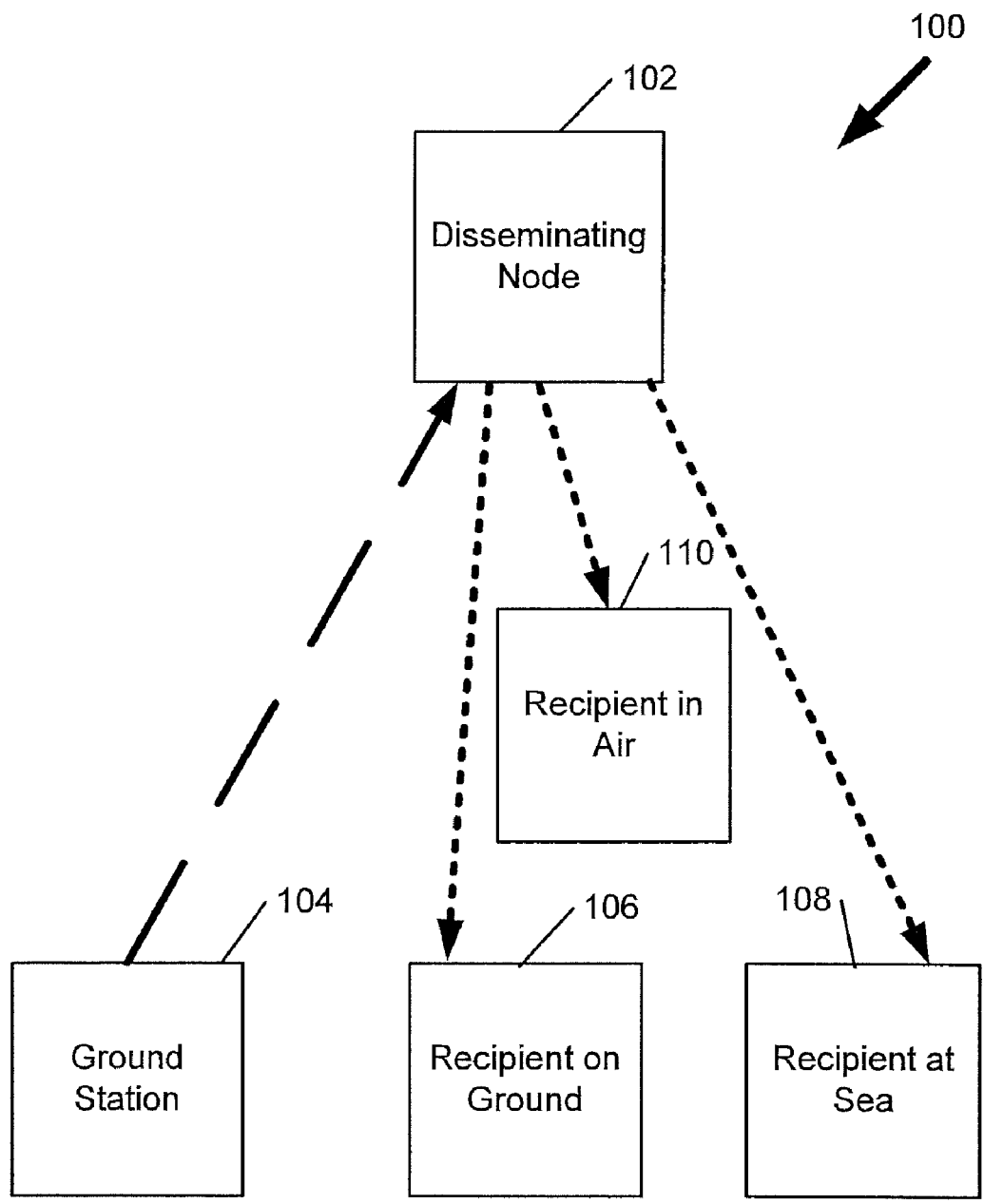
FIG. 1 depicts an exemplary system including a disseminating node and several recipient devices in which the node is communicating with the recipient devices in accordance with an embodiment of the invention.

FIG. 1 illustrates an exemplary system diagram of an implementation of the invention. System 100 includes disseminating node 102, which may reside in, for example, an aircraft, a satellite, or a lighter than air vehicle, such as a blimp, a dirigible or a balloon. Alternatively, the disseminating node may reside in a fixed tower, such as a cellular or television tower.

Original content for dissemination may come from anywhere, for example, earth, sea or space. In many cases, disseminating node 102 may receive original content from ground station 104 for dissemination to a group of recipient or user devices, such as a recipient on the ground 106, a recipient at sea 108, and a recipient in the air 110, such as a device in an aircraft.

Ground station 104 may reliably transmit the original content to disseminating node 102 via a conventional protocol, such as a protocol of the Internet Protocol (IP) suite, Ethernet frames, Asynchronous Transfer Mode (ATM), Synchronous Optical NETwork (SONET) or via any other convenient mechanisms. The communications link from ground station 104 to disseminating node 102 may be via radio frequency (RF), optical, acoustical, magnetic, or other forms of communications.

Various encoding schemes for encoding loss-resilient data such that data may be recovered without retransmission are well known. Such loss-resilient techniques require the transmission of redundant data items. Examples of such techniques include Reed-Solomon techniques and Fourier transform-based techniques. Other techniques for encoding loss-resilient messages are described in U.S. Pat. No. 6,195,777, U.S. Pat. No. 6,163,870, U.S. Pat. No. 6,081,909 and U.S. Pat. No. 6,073,250 all to Luby et al., all of which are herein incorporated by reference.

Loss-resilient messages include redundant data items, such that by transforming a sequence of M blocks of original content into N transformed blocks, where M and N are integers and N is greater than or equal to M, the block may be transmitted or broadcast to a group of devices in a manner that does not require acknowledgments from the receiving device. When K distinct transformed blocks have been received, where K is an integer and K<N, the receiving device may reconstruct the original content. Thus, a protocol, such as the IP datagram protocol, may be used to broadcast data to multiple users in a very demanding environment in which a large amount of data loss or corruption may be expected.

Figure 2:
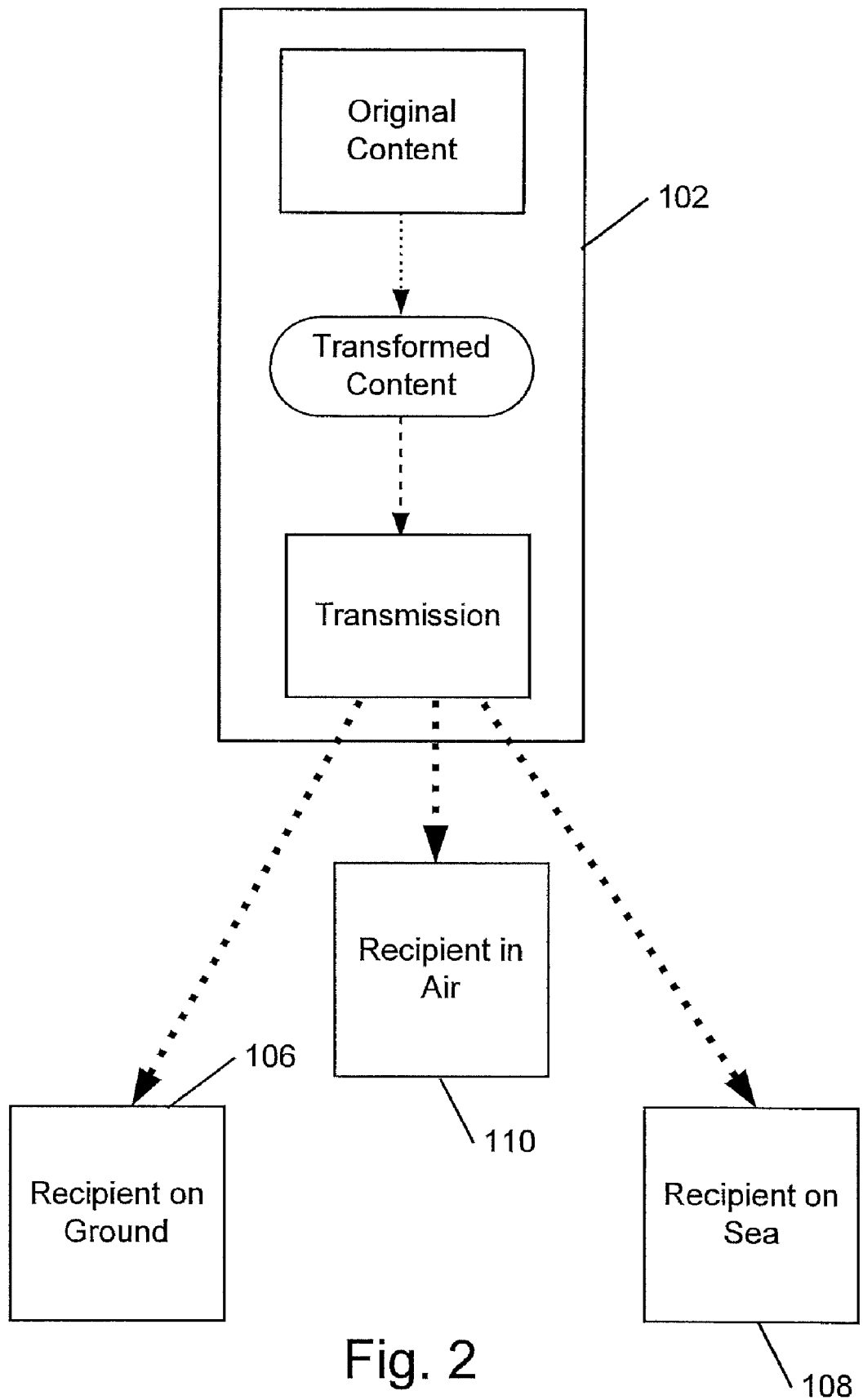
FIG. 2 depicts a more detailed view of the exemplary system of FIG. 1 illustrating transformation of original content in the disseminating node and broadcasting to the multiple recipient devices.

FIG. 2 illustrates aspects of system 100 of FIG. 1. A disseminating node 102 transforms M blocks of original content, using a loss-resilient technique, into N transformed blocks and transmits or broadcasts the N transformed blocks to multiple user devices, such as user devices on the ground 106, in the air 110 and at sea 108.

Figure 3:
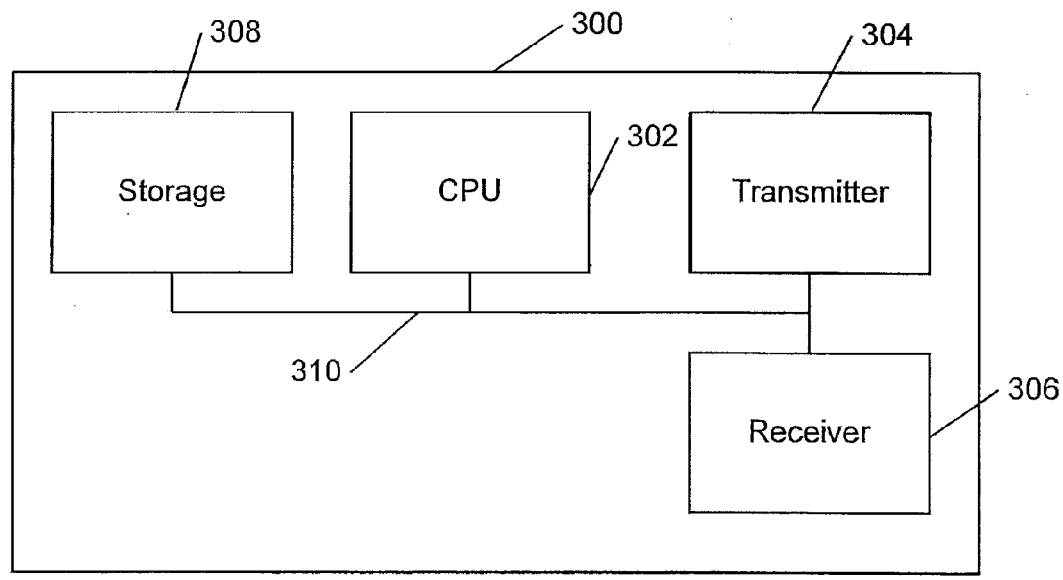
FIG. 3 illustrates an exemplary device which may be used as the node and the recipient devices.

FIG. 3 illustrates an exemplary device 300, which may be used as disseminating node 102, ground station 104, recipient device on ground 106, recipient device at sea 108, or recipient device in air 110. Device 300 includes a central processing unit (CPU) or processor 302, transmitter 304 for transmitting a message, a receiver for receiving a message, a storage 308, for example, Random Access Memory (RAM), magnetic disk, optical disk, or any other storage medium, and a bus 310 connecting the above-mentioned elements of device 300. In other implementations, device 300 takes other forms.

Figure 4:
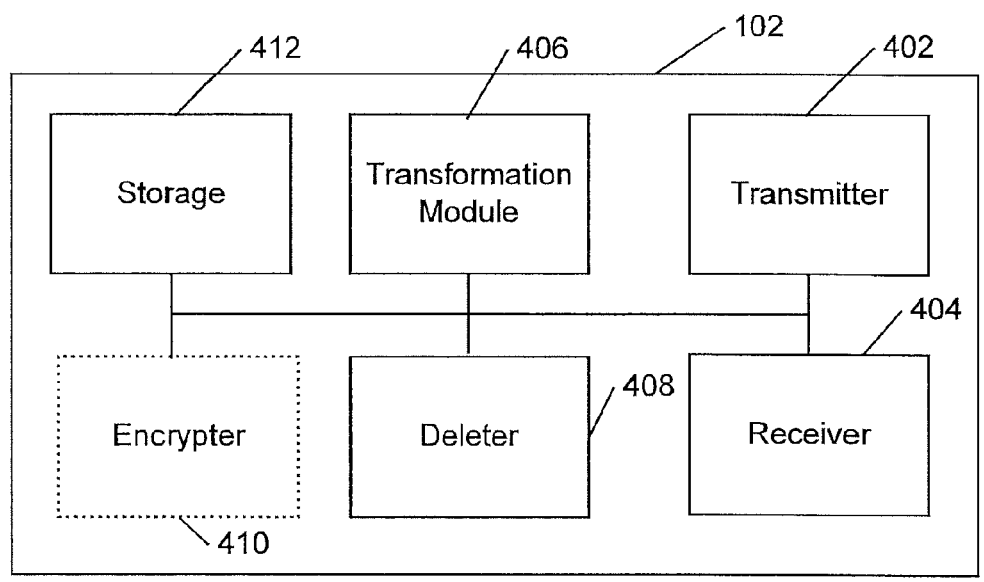
FIG. 4 illustrates an exemplary functional block diagram of the node.

FIG. 4 is functional block diagram of exemplary disseminating node 102. Disseminating node 102 may include a transmitter 402 to transmit transformed content to multiple devices, a receiver 404 for receiving content from ground station 104 or any other source, transformation module 406 for transforming received original content Node 102 may further include a transmission schedule and a recipient schedule, which may be included in storage 412. The transmission schedule includes information related to the transmission of transformed content to the multiple user devices. The recipient schedule includes a transmission time of the transformed content.

FIG. 5 illustrates an exemplary format of an entry in transmission schedule 500. Field 502 contains a content ID identifying the content. Field 504 contains a version ID providing an indication of the version of the content. Field 506 includes a block identifier or number for identifying a particular block. Field 510 includes a meta-content packet identifier identifying a particular meta-content packet. A meta-content packet is a packet that is transformed via a loss-resilient encoding method. In one implementation, each meta-content packet corresponds to a respective transformed block. Optionally, the transmission schedule may include field 508, which indicates a number of times the block has been transmitted. Field 512 indicates a number of times the block may be transmitted. Field 514 indicates the percentage of total bandwidth that may be used to transmit the transformed blocks from disseminating node 102 to the multiple recipient devices.

FIG. 6 illustrates an exemplary format of a recipient schedule 600 that may be broadcast to recipient devices from disseminating node 102. Recipient schedule 600 may include transmission time 602, content ID 604, version ID 606 and file size 608. Transmission time 602 may be a time, for example, Greenwich Mean Time, or an amount of time since a particular time point, such as midnight, at which the transformed content is scheduled to be broadcast by disseminating node 102. The amount of time may be indicated in seconds, minutes, hours or any other unit. Content ID 604 and Version ID 606 correspond to fields 502 and 504, respectively, of transmission schedule 500. File size 608 is a size of the file in bytes, blocks or any other unit.

Figure 7:
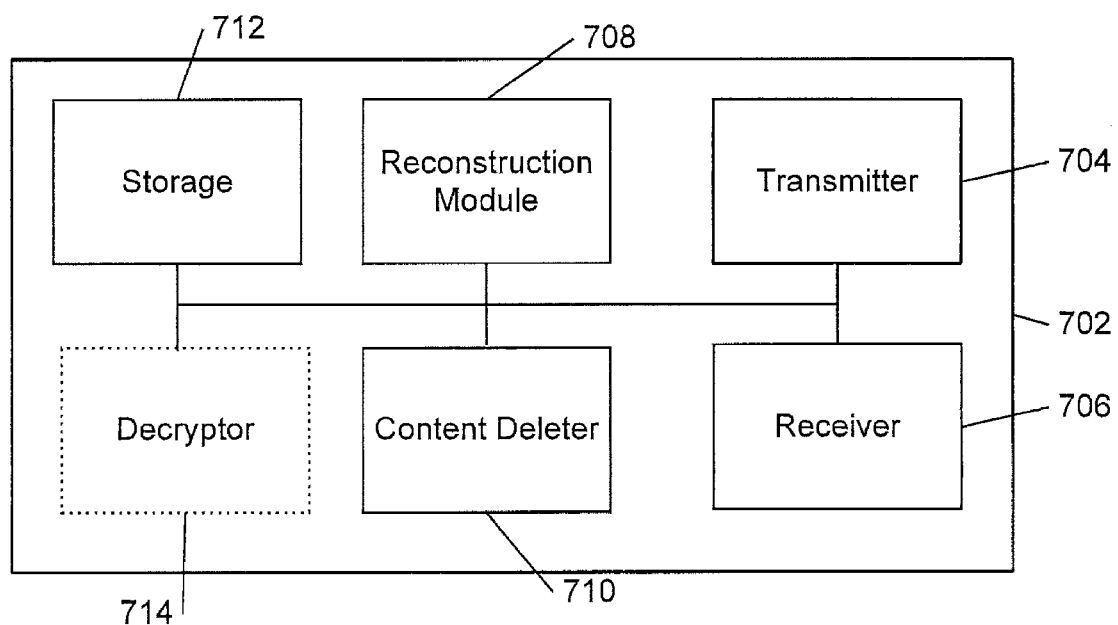
FIG. 7 is a functional block diagram of an exemplary recipient device.

FIG. 7 is functional block diagram of an exemplary recipient device 702, which may correspond to recipient devices 106, 108, and 110 (FIG. 1). Recipient device 702 may include a transmitter 704 for transmitting messages, a receiver 706 for receiving transformed blocks from disseminating node 102, reconstruction module 708 for reconstructing original content from received transformed blocks, a content deleter 710 to delete outdated content and storage 712 for storing received transformed blocks. Storage 712 also may be used to store a received recipient schedule. Storage 712 may be magnetic disk, optical disk, RAM, or any other storage medium. Optionally, recipient device 702 may include decryptor 714 for decrypting received encrypted transformed content. Storage 712 may include a database storage to maintain a record of received transformed blocks from disseminating node 102. Reconstruction module 708 may reconstruct original content from transformed blocks that were encoded using conventional loss-resilient techniques, such as those described in U.S. Pat. Nos. 6,195,777, 6,163,870, 6,081,909 and 6,073,250.

Figure 8:
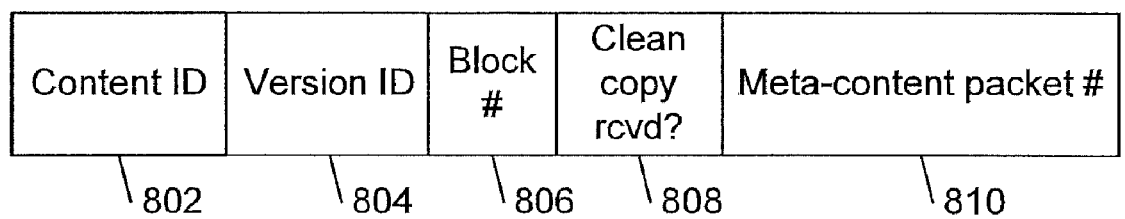
FIG. 8 shows an exemplary format for a record of received blocks, which may be included in a database of an exemplary recipient device.

FIG. 8 illustrates an exemplary format of data included in such a database. Field 802 of an exemplary database includes a content ID identifying received content. Field 804 includes a version identifier identifying a particular version of the received content. Field 806 includes a block number identifying a particular block of the particular version of the content. Field 808 indicates whether the corresponding block was successfully received. Field 810 includes an identifier of a meta-content packet or a transformed packet corresponding to the block number indicated by field 806.

Figure 9:
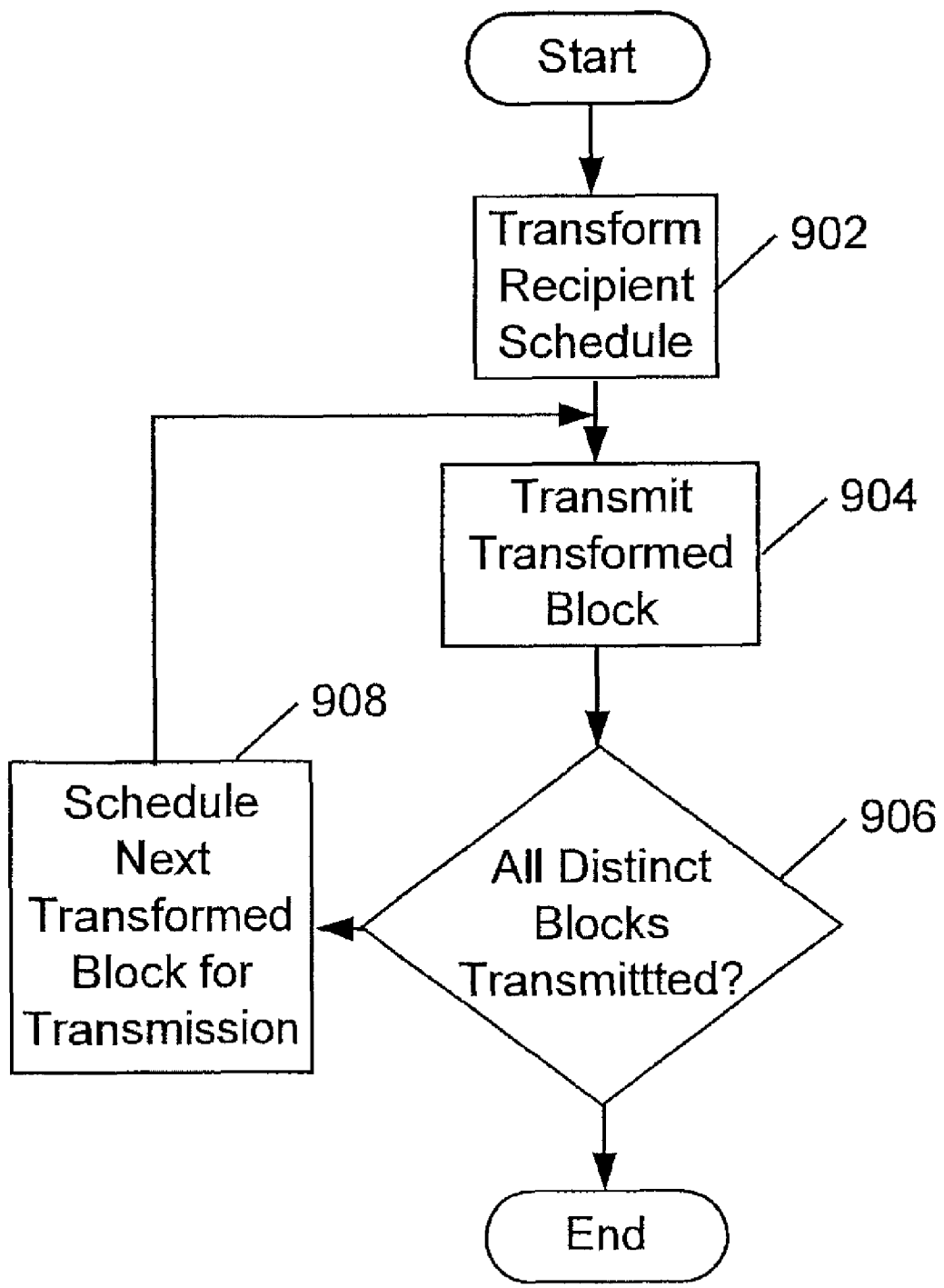
FIG. 9 is a flowchart illustrating processing in an exemplary node concerning a recipient schedule.

FIG. 9 is a flowchart illustrating a process in an implementation of disseminating node 102 for disseminating recipient schedule 600 to recipient devices. Disseminating node 102 may include a recipient schedule, which may have been received from ground station 104 via a reliable transmission link or from any other source and may be stored in storage 412 (FIG. 4).

At act 902, transformation module 406 may transform the recipient schedule into a redundant loss-resilient content. For example, transformation module 406 may transform the recipient schedule into transformed blocks including loss-resilient meta-content. At act 904, transmitter 402 transmits or broadcasts, according to a transmission schedule, the transformed blocks of the recipient schedule to multiple user devices. At act 906, disseminating node 102 may determine whether all of the transformed blocks have been sent. This may be performed by referring to the transmission schedule or by counting the number of distinct blocks transmitted. Assuming that there are N distinct blocks, when the counter reaches N, all distinct blocks have been transmitted. At act 908, disseminating node 102 may schedule a next transformed block for transmission, according to the transmission schedule by placing the next transformed block in a transmit queue. At act 904, transmitter 402 may transmit or broadcast the next transformed block. If, at act 906, disseminating node 102 determines that no blocks remain to be sent (for example, N blocks have been transmitted), then transmission to the multiple user devices is complete.

Figure 10:
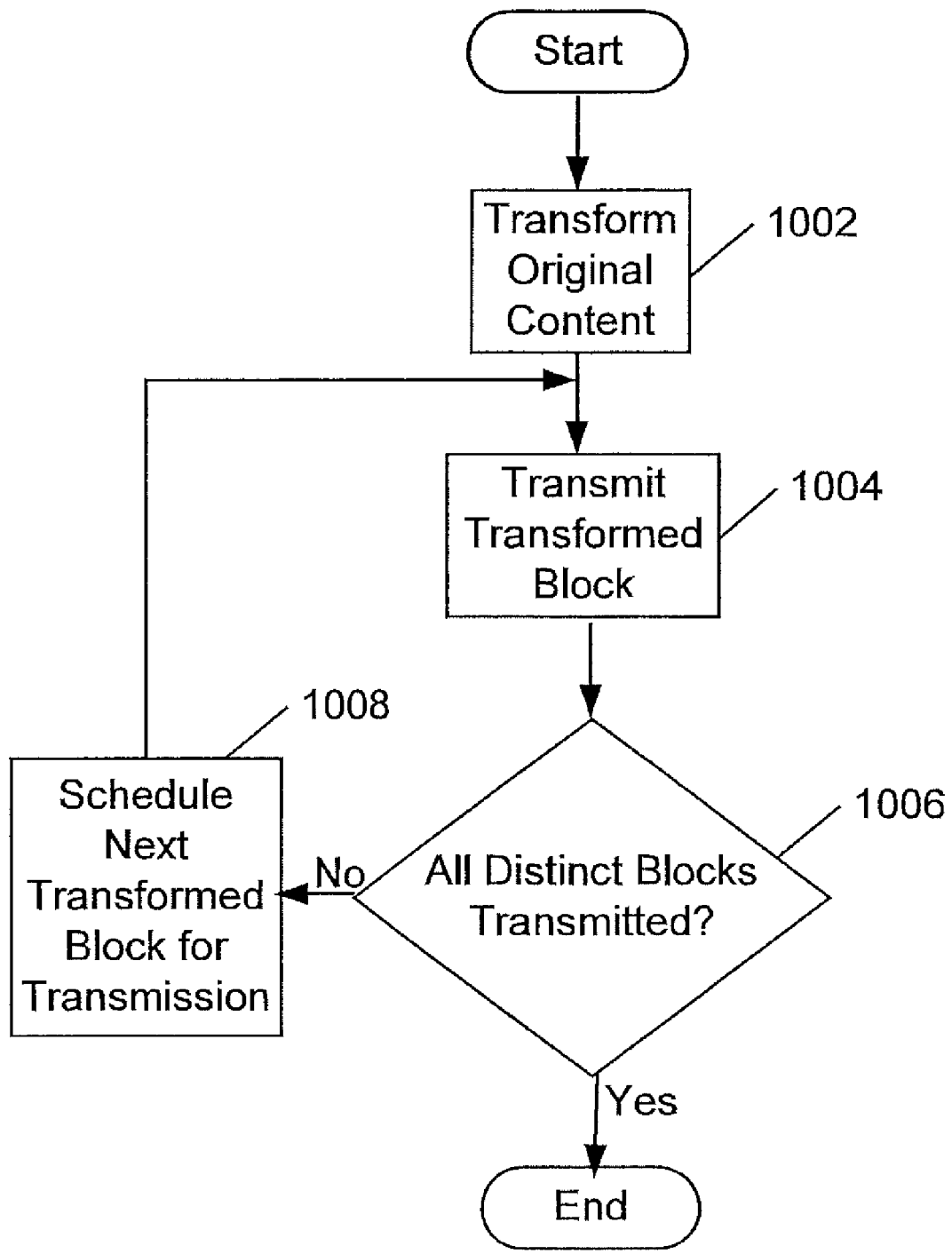
FIG. 10 is a flowchart illustrating processing of original content in an exemplary node.

FIG. 10 is a flowchart illustrating processing in an exemplary implementation of disseminating node 102. Disseminating node 102 includes original content, which may have been received from ground station 104 or any other source and may be stored in storage 412 (FIG. 4).

At act 1002, transformation module 406 may transform the original content into a redundant loss-resilient content. For example, transformation module 406 may transform the original content into transformed blocks including loss-resilient meta-content. At act 1004, transmitter 402 transmits or broadcasts, according to a transmission schedule, the transformed blocks of the content to multiple user devices. At act 1006, disseminating node 102 may determine whether all of the transformed blocks have been sent. This may be performed by referring to the transmission schedule or by counting the number of distinct blocks transmitted. Assuming that there are N distinct blocks, when the counter reaches N, all distinct blocks have been transmitted. At act 1008, disseminating node 102 may schedule a next transformed block for transmission, according to the transmission schedule by placing the next transformed block in a transmit queue. At act 1004, transmitter 402 may transmit or broadcast the next transformed block. If, at act 1006, disseminating node 102 determines that no blocks remain to be sent (for example, N blocks have been transmitted), then transmission to the multiple user devices is complete.

Figure 11:
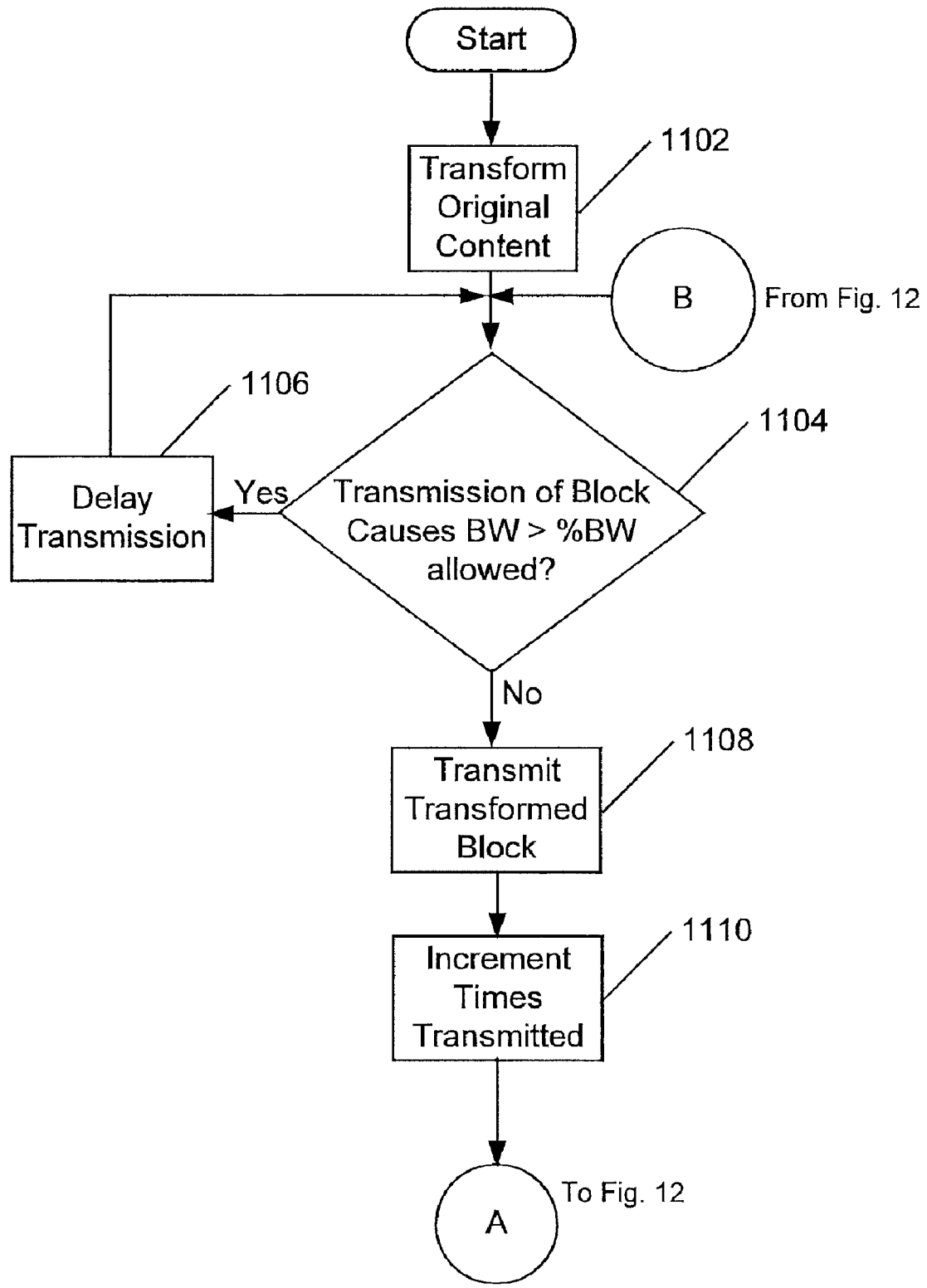
FIGS. 11 and 12 are flowcharts illustrating processing in an exemplary node in accordance with another embodiment.
Figure 12:
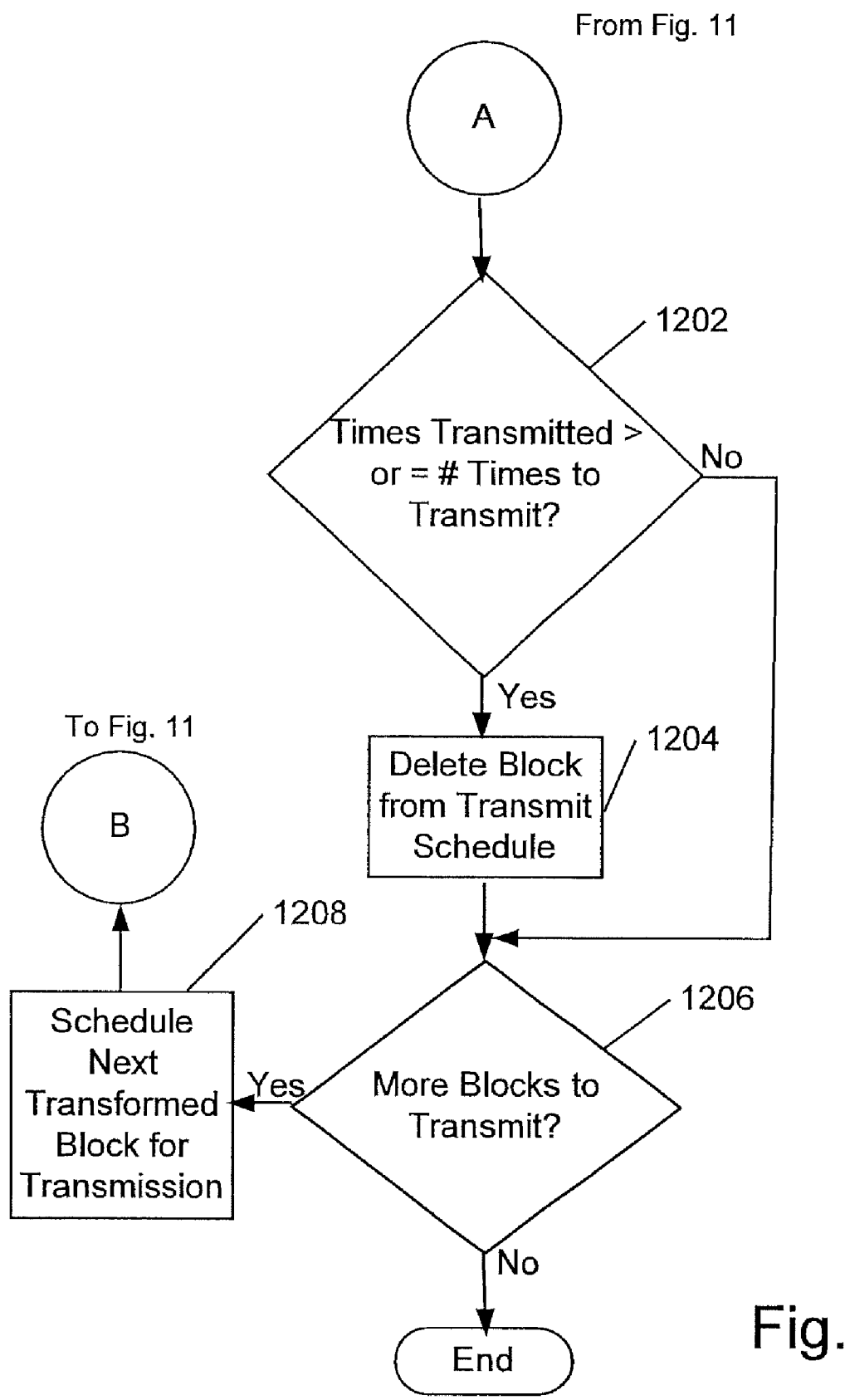

FIGS. 11 and 12 are flowcharts that illustrate processing in another implementation of disseminating node 102. Original content is stored in storage 712. Ground station 104 may have sent the original content to disseminating node 102 via a reliable communication link or the original content may be sent to disseminating node 102 from any other source. At act 1102, transformation module 406 may transform the original content by using a loss-resilient encoding method. At act 1104, disseminating node 102 may refer to field 514 of the transmission schedule for the respective block to determine whether a current bandwidth for the transmission of the content will exceed the allowed percentage of the total bandwidth for the content if the block is transmitted. Current bandwidth may be determined by calculating an amount of bandwidth used for a most recent predefined time period, for example, a most recent 10 second period. The current bandwidth may be calculated after transmission of each meta-content packet. If broadcasting or transmitting the block would cause the bandwidth to exceed the allowed percentage or total bandwidth, as described in field 514 of the transmission schedule, then, at act 1106, transmission of the block may be delayed and the check at act 1104 will be performed again after the delay. The delay may be for a predetermined time period, for example, 2 seconds. At act 1104, disseminating node 102 may compare the percentage of total bandwidth allowed, field 514, with the current bandwidth used to transmit the content over the most current predefined period of time. Alternatively, disseminating node 102, at act 1106, may instead schedule another block for transmission, for example the next block that would be transmitted or the block that would be transmitted after the next 2 blocks by placing that block on the transmit queue.

At act 1108, transmitter 402 transmits or broadcasts the transformed block and at act 1110, disseminating node 102 may increment field 508 of the corresponding entry in the transmission schedule. At act 1202 (FIG. 12), disseminating node 102 compares the number of transmissions field 508 to the number of times allowed to transmit field 512. If the number of transmissions field 508 is greater than or equal to the number of times allowed to transmit field 512, then deleter 408 may delete the entry of the transmission schedule that includes the current block from the transmission schedule so that the block will no longer be transmitted. Optionally, deleter 408 may instead include an indication in the corresponding transmission schedule entry indicating that this entry is not to be transmitted.

After deletion of the block at act 1204 or if the number of transmissions field 508 does not exceed the number of times allowed to transmit field 512, disseminating node 102 determines, at act 1206, whether any additional blocks exist to transmit or broadcast. This may be performed by referring to the transmission schedule. If no blocks are to be transmitted, then transmission of the transformed content is complete. Otherwise, at act 1208 the disseminating node 102 schedules the next transformed block for transmission by transmitter 402, according to the transmission schedule, and, at act 1104, disseminating node 102 may determine whether the transmission of the block would cause the bandwidth to exceed the percentage of bandwidth permitted for use if the transformed content is transmitted.

Figure 13:
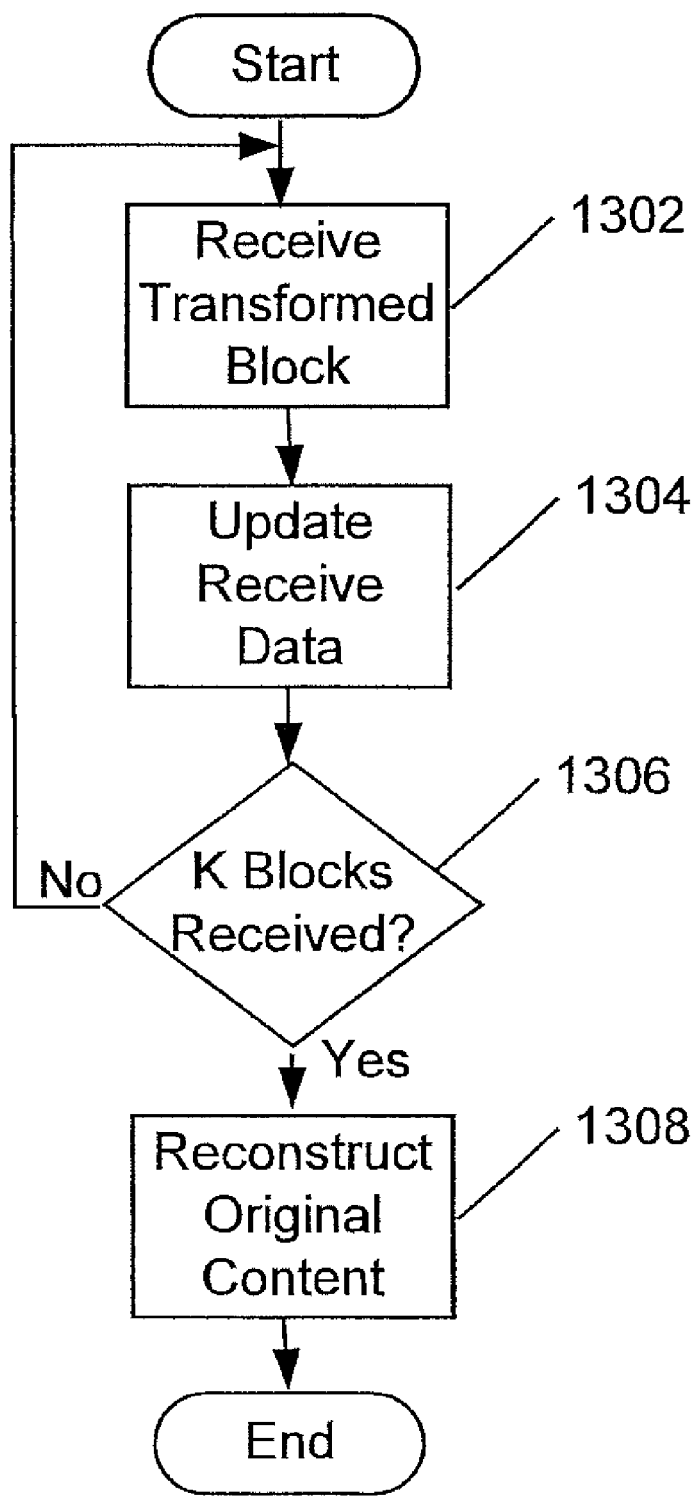
FIG. 13 is a flowchart illustrating processing in an exemplary recipient device.

FIG. 13 is a flowchart that illustrates processing in an exemplary implementation of recipient device 702 corresponding to one of recipient devices 106, 108, and 110. At act 1302, receiver 606 receives the transformed block from disseminating node 102. Each received transformed block may include a content identifier, a version identifier and a block number. Recipient device 702 may maintain a record or database of the blocks received for a particular content and version. At act 1304, recipient device 702 updates the database of the received blocks to indicate content ID in field 802 (FIG. 8), version ID in field 804, block number in field 806, whether the block had been successfully received in field 808 and in field 810, a meta-content packet indicator referring to the received meta-content packet corresponding to the block number indicated by field 806. Alternatively, field 810 may include the particular meta-content packet. At act 1306, reconstruction module 708 determines whether enough transformed blocks have been received to reconstruct the original content, for example, whether K blocks have been received. If the required number of transformed blocks have not yet been received, then at act 1302, recipient device 702 awaits receipt of a new transformed block. Otherwise, at act 1308, reconstruction module 708 reconstructs the original content, which may then be stored in storage 712. For example, reconstruction module 708 may use conventional techniques to reconstruct the original content from K blocks of the content.

In other implementations of recipient device 704, at act 1304 if an unknown content and/or version identifier is received, content deleter 710 may delete the transformed blocks corresponding to the unknown content and/or version identifier. Alternatively, if a newer version identifier is received that indicates a new version of the content, then content deleter 710 may delete all blocks pertaining to the older version of the content by referring to the transmission schedule having the format corresponding to FIG. 5.

Recipient device 702 may receive recipient schedule 600 using the exemplary process of FIG. 13. Further, energy conservation techniques may be employed to reduce power consumption in node 102 until a time when desired content is scheduled to be broadcast. Power reducing techniques are well known. Such techniques are disclosed in U.S. Pat. Nos. 5,507,039 to Honma, 6,397,053 to Ghiazza, and 6,006,336 to Watts, Jr. et al. U.S. Pat. Nos. 5,507,039, 6,397,053 and 6,006,336 are incorporated herein by reference in their respective entireties. Using power reducing techniques, recipient device 702 may, after receiving the recipient schedule, reduce power until a scheduled broadcast time of desired content or until a short period of time before the scheduled broadcast time, for example two minutes before. Alternatively, receiver 706 may be powered off until or near the scheduled broadcast time of desired data.

In some implementations, it may be possible to provide an added layer of security, such that not all recipients may be able to receive the encrypted original contents. In such an implementation, disseminating node 102 may encrypt the original content and recipient device 702 may decrypt the reconstructed encrypted original content. Similarly, node 102, and recipient device 102 may encrypt the recipient schedule and may decrypt the reconstructed encrypted recipient schedule, respectively.

Figure 14:
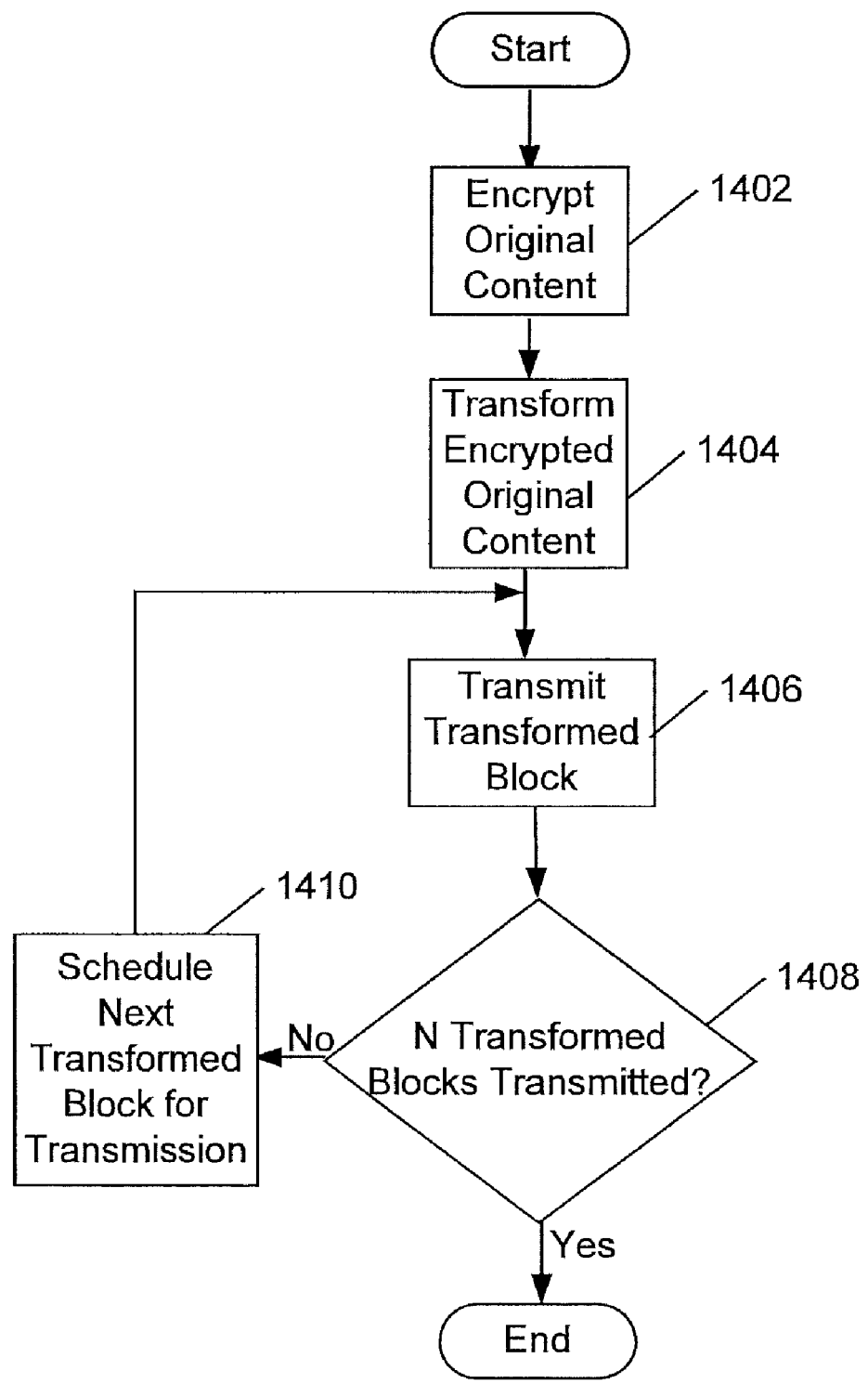
FIG. 14 is a flowchart illustrating processing in an exemplary node using encryption.

FIG. 14 is a flowchart illustrating processing in an exemplary implementation of disseminating node 102 that encrypts original content. The original content may have been received from ground station 104 or any other source and may be stored in storage 412 (FIG. 4). At act 1402, encrypter 410 may encrypt the original content using an encryption key. At act 1404, transformation module 406 may transform the encrypted original content according to a loss-resilient encoding method. With regard to this example, N transformed encrypted blocks are to be transmitted. At act 1406, transmitter 402 transmits or broadcasts the transformed block to one or more recipient devices. At act 1408, disseminating node 102 determines whether all N transformed blocks have been transmitted by referring to the transmission schedule or by counting the number of distinct blocks transmitted. If not all N blocks have been transmitted, disseminating node 102 at act 1410, may schedule the next transformed block for transmission according to the transmission schedule and at act 1406, transmitter 402 transmits or broadcasts the transformed block. If, at act 1408, disseminating node 102 determines that no additional blocks are to be transmitted or broadcast, then the transmission process is complete. The same process may be used to transform and encrypt the recipient schedule. Thus, in an implementation of disseminating node 102, the recipient schedule may be encrypted at act 1402 and transmitted at act 1406.

Encryption may be used with other implementations of disseminating node 102. For example, the method illustrated in FIG. 11 and FIG. 12 may be modified to use encryption by encrypting the original content prior to act 1102. At act 1102, transformation module 406 may transform the encrypted original content.

Figure 15:
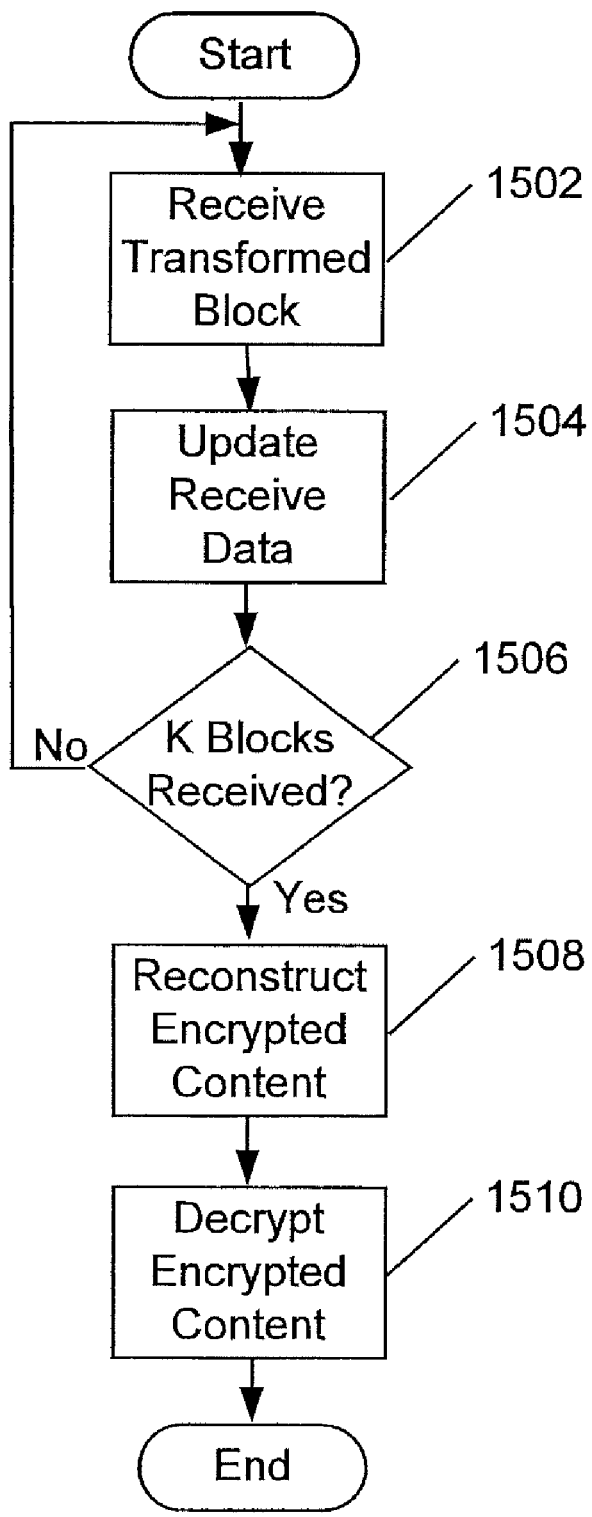
FIG. 15 is a flowchart illustrating processing in an exemplary recipient device using decryption.

FIG. 15 is a flowchart illustrating an exemplary process performed by recipient device 702 for receiving encrypted content. At act 1502, recipient device 702 receives a transformed block. At act 1504, recipient device 702 may update a database that may have a format as illustrated in FIG. 8 to include the content and version ID of the received transformed block, the block number, whether the block had been successfully received and an indicator of the meta-content packet or the meta-content packet itself. This information may be used by recipient device 702 at a later time, for example, to determine whether K blocks have been received or whether outdated content should be deleted. At act 1506, recipient node 702 determines whether enough blocks (K blocks) have been successfully received to reconstruct the encrypted original content. If not, then at act 1502, receiver 404 awaits reception of the next transformed block transmitted by disseminating node 102. If, at act 1506, reconstruction module 708 determines that enough blocks have been successfully received to reconstruct the encrypted contents, then at act 1508, reconstruction module 708 reconstructs the encrypted original content by decoding the data transmitted via the encoded loss-resilient method. At act 1510, decryptor 714 decrypts the encrypted content according to a decryption key, thereby, recovering the unencrypted original content. Recipient device 702 may use the process of FIG. 15 to receive the recipient schedule. Thus, in act 1508, reconstruction module 708 may reconstruct the encrypted recipient schedule and in act 1510, decryptor 714 may decrypt the encrypted reconstructed schedule.

CONCLUSION

Systems and methods consistent with the present invention provide a robust method for transmitting content to multiple devices according to a transmit schedule and for receiving content by multiple users.

The foregoing description of the preferred embodiments of the present invention are provided for illustration and description, but is not intended to be limiting or to limit the invention to the precise form disclosed. Modifications and variations are possible in light of the above teachings or may be acquired from practice of the invention for example, while series of acts have been described with regard to FIGS. 9-15, the order of the acts may differ in other implementations consistent with the present invention. Also, non-dependent acts may be performed in parallel.

No element, act or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method of transmitting information to a plurality of user devices in a network, the method comprising:
   performing at a transmitting device:
      transforming a sequence of M blocks of the information into N transformed blocks, where M and N are integers and N≧M, and where each of the N transformed blocks comprises at least some of the information; and
      transmitting each of the N transformed blocks in accordance with a transmission schedule, where the transmitting includes transmitting a particular one of the N transformed blocks with a content identifier and a version identifier; and
   performing at least one of the user devices:
      receiving the particular N transformed block with the first content identifier and the first version identifier;
      receiving another one of the N transformed blocks, where the other one of the N transformed blocks includes the first content identifier and a second version identifier;
      determining that the first version identifier is older than the second version identifier;
      discarding the particular N transformed block, in response to determining that the first version identifier is older than the second version identifier;
      receiving K distinct ones of the N transformed blocks, where K is an integer and K<N; and
      reconstructing all of the information from the K received transformed blocks.

2. The method of claim 1, where the transmission schedule includes a re-transmission limit for particular ones of the N transformed blocks, the method further comprising:
   deleting a particular N transformed block when the re-transmission limit is reached for the particular N transformed block.

3. The method of claim 1, further comprising:
   maintaining, at the at least one of the user devices, a record of which ones of the N transformed blocks have been received.

4. The method of claim 1, further comprising:
   receiving a particular N transformed block with an unidentifiable content identifier; and
   discarding the particular N transformed block, in response to the particular N transformed block including an unidentifiable content identifier.

5. The method of claim 1, where the transforming includes transforming the transmission schedule, and where the method further comprises:
   transmitting the transformed transmission schedule to the at least one of the user devices, where the transformed transmission schedule includes a transmission time associated with the information.

6. The method of claim 5, further comprising:
   receiving, at the at least one of the user devices, the transformed transmission schedule;
   reconstructing, at the at least one of the user devices, the transformed transmission schedule; and
   reducing power consumption of the at least one of the user devices until the transmission time included in the reconstructed transmission schedule.

7. A system comprising:
   a transmission device; and
   a receiver device;
   where the transmission device:
      transforms a sequence of M blocks of information into N transformed blocks, where M and N are integers and N≧M, and where each of the N transformed blocks comprises at least some of the information;
      determines an allowed bandwidth for transmission of the information;
      delays transmission of a particular one of the N transformed blocks when transmitting the particular one of the N transformed blocks would cause a current bandwidth to exceed the allowed bandwidth;
      transmits a next one of the N transformed blocks when transmitting the particular one of the N transformed blocks would cause the current bandwidth to exceed the allowed bandwidth; and
      transmits each of the N transformed blocks in accordance with a transmission schedule; and
   where the receiver device:
      receives K distinct ones of the N transformed blocks, where K is an integer and K<N; and
      reconstructs all of the information from the K received transformed blocks.

8. The system of claim 7, where the transmission device resides in at least one of an aircraft, a satellite, a lighter than air vehicle, or a stationary tower.

9. The system of claim 7, where the transmission device receives the information from a ground station.

10. The system of claim 7, where the transmission device and the receiver device reside in an ad hoc network.

11. The system of claim 7, where the transmission device encrypts the information using an encryption key and where the receiver device decrypts the reconstructed information using the encryption key.

* * * * *